(12) United States Patent
Ishimasa et al.

(10) Patent No.: US 7,576,931 B2
(45) Date of Patent: Aug. 18, 2009

(54) DRIVING UNIT FOR OPTICAL PICK-UP INCLUDING LENS

(75) Inventors: Toru Ishimasa, Tokyo (JP); Satoko Uchikawa, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 11/898,876

(22) Filed: Sep. 17, 2007

(65) Prior Publication Data

US 2008/0088955 A1    Apr. 17, 2008

(30) Foreign Application Priority Data

Sep. 19, 2006   (JP) .............................. 2006-251984

(51) Int. Cl.
   *G02B 7/02*   (2006.01)
(52) U.S. Cl. ...................... 359/822; 359/823
(58) Field of Classification Search .................. 359/822
   See application file for complete search history.

(56) References Cited

U.S. PATENT DOCUMENTS 7,099,088 B2 *   8/2006   Okuda ........................ 359/696

2002/0141081 A1 *   10/2002   Onda ........................ 359/823

FOREIGN PATENT DOCUMENTS

JP           2005-24968           1/2005

* cited by examiner

*Primary Examiner*—Jordan M. Schwartz
*Assistant Examiner*—James C Jones
(74) *Attorney, Agent, or Firm*—Wenderoth, Lind & Ponack, L.L.P.

(57) ABSTRACT

A lens driving unit includes a lead screw, a nut having a projection, and a lens frame having a contact portion that is supported movably in the direction of an optical axis with respect to a base and that is brought into contact with the nut. The nut is held so that only an end face thereof in the direction of the optical axis comes into contact with the lens frame. The base has a guide groove that receives and guides the projection in the direction of the optical axis. The base or the lens frame has a regulatory wall that directs and guides the projection of the nut screwed to the lead screw toward the guide groove only during assembly.

6 Claims, 13 Drawing Sheets

DRIVING UNIT FOR OPTICAL PICK-UP INCLUDING LENS

BACKGROUND OF THE INVENTION

1. Technical Field

This invention relates to a driving unit that drives a lens frame holding a lens by a screw engagement structure formed by a lead screw and a nut, in the direction of an optical axis.

2. Background Art

A well-known, conventional lens-driving unit includes a base (or a case), a lens frame holding a lens, a guide shaft fixed to the base so as to guide the lens frame in a direction of an optical axis, a motor fixed to the base, a lead screw connected directly to the motor so as to be rotated and driven, a nut that is held unrotatably with respect to the lens frame and detachably in the direction of the optical axis and that is screwed onto the lead screw, a guide groove (rotation stopping groove) formed integrally with the base so as to slidably guide projections of the nut in the direction of the optical axis, and a coil spring that urges the lens frame toward the nut. One of the projections of the nut is unrotatably held by being engaged with the rotation stopping groove of the lens frame, whereas the other projection of the nut is engaged with the guide groove of the base with slight looseness so as to be guided in the direction of the optical axis. The lead screw is rotated by the motor, and the nut is advanced in a screwed manner, and, as a result, the lens frame is moved in the direction of the optical axis (see Unexamined Japanese Patent Publication No. 2005-24968, for example).

However, in the conventional unit mentioned above, the projection of the nut is engaged directly with (or is brought into direct contact with) the rotation-stopping groove of the lens frame. Therefore, there is a fear that the projection of the nut will repeatedly strike against the rotation stopping groove while making a bumpy movement, and, as a result, the lens frame will be vibrated in a direction perpendicular to the optical axis, because of a load fluctuation caused by an assembly tolerance between the lead screw and the nut or caused by a machining tolerance in a screw part formed on them, or because of the rotational driving force of the motor and a reaction thereagainst.

Therefore, in a CD or DVD optical pick-up unit provided with this unit, there is a fear that, when the lens frame is moved in the direction of the optical axis during reading or writing of data recorded on a disk, the optical axis of the lens will be irregularly varied, thus making it difficult to keep a focus located on the disk constant.

SUMMARY OF THE INVENTION

The present invention has been made in consideration of these circumstances. It is therefore an object of the present invention to provide a lens driving unit capable of stably driving a lens frame (and a lens in the frame) in the direction of an optical axis with high accuracy without vibrating the lens frame so that slight vibrations are not transmitted to the lens frame even if a nut generates these vibrations, capable of reliably attaching the nut while directing the nut in a predetermined direction during assembly, and capable of achieving a simplification of the structure and a reduction in size.

The lens driving unit of the present invention that achieves the above-mentioned object includes a base, a driving source fixed to the base, a lead screw rotated and driven by the driving source, a nut that is screwed to the lead screw and that has a projection protruding in a radial direction, and a lens frame that is supported movably in a direction of an optical axis with respect to the base and that has a contact portion coming into contact with the nut in the direction of the optical axis. In the lens driving unit, the nut is held so that only an end face thereof in the direction of the optical axis comes into contact with the lens frame. The base has a guide groove that receives and guides the projection in the direction of the optical axis, and the base or the lens frame has a projection-guiding part that directs and guides the projection of the nut screwed to the lead screw toward the guide groove only during assembly.

According to this structure, when the lead screw is rotated by the rotational driving force of the driving source, the nut is advanced in a screwed manner in the direction of the optical axis while allowing the base to regulate the rotation of the nut, and the lens frame is moved in the direction of the optical axis while following the nut.

Herein, the nut is brought into contact with the lens frame only in the direction of the optical axis and engaged unrotatably with respect to the base. Therefore, even if the nut generates slight vibrations, these vibrations are caught by the base, and are not transmitted to the lens frame. Therefore, the lens frame (lens) is stably moved in the direction of the optical axis without being vibrated. As a result, if this lens driving unit is mounted on, for example, an optical pick-up unit, the focus can be kept constant without irregularly varying the optical axis even while the lens is being driven.

Additionally, the projection of the nut is guided by the projection-guiding part formed on the base or on the lens frame, and is fitted into the guide groove during assembly. Therefore, the projection can be securely attached so as not to deviate from the guide groove. Therefore, the structure can be simplified, and the assembling operation can be facilitated, thus a desired function can be reliably assured.

In the above-mentioned structure, the projection guiding part may include a regulatory wall that is formed on the lens frame so as to protrude in the direction of the optical axis from an area around the contact portion to restrict a direction of the projection to a predetermined angular range.

According to this structure, the projection of the nut is securely and easily fitted into the guide groove while being directed in a predetermined direction by the regulatory wall of the lens frame during assembly. Additionally, the regulatory wall formed integrally with the lens frame is used as a projection guiding part. Therefore, this unit can be made simpler in structure than a conventional unit including a specialized part. Still additionally, if the lens frame is molded from resin, the contact portion and the regulatory wall (the projection guiding part) can be easily molded together.

In the above-mentioned structure, the projection guiding part may include a regulatory wall that is formed on the base so as to protrude from an area near the guide groove toward the nut and extend in the direction of the optical axis to restrict a direction of the projection to a predetermined angular range.

According to this structure, the projection of the nut is securely and easily fitted into the guide groove while being directed in a predetermined direction by the regulatory wall of the base during assembly. Additionally, the regulatory wall formed integrally with the base is used as a projection guiding part. Therefore, this unit can be made simpler in structure than a conventional unit including a specialized part. Still additionally, if the base is molded from resin, the regulatory wall (the projection guiding part) can be easily molded.

In the above-mentioned structure, the base may include a first base half body that rotatably supports the lead screw and a second base half body that defines the guide groove and that is attached to the first base half body.

According to this structure, the projection is fitted into the guide groove by attaching the second base half body to the first base half body in a state in which the nut is engaged with the lead screw held by the first base half body and in which the projection of the nut is directed in a predetermined direction by the projection guiding part. Therefore, the elements can be attached more easily and reliably.

In the above-mentioned structure, the lens driving unit may further include a pair of wall parts that define the guide groove, each of the pair of wall parts having an inclined surface used to guide the projection of the nut to the guide groove.

According to this structure, the projection of the nut is guided to the guide groove along the inclined surface (formed on the end face edge) of each of the pair of wall parts during assembly. Therefore, the projection can be smoothly fitted into the guide groove.

In the above-mentioned structure, the contact portion of the lens frame may be formed so as to be detachably in contact with the end face of the nut only from one direction in the direction of the optical axis, and may be urged by a spring so as to come into contact with the nut.

According to this structure, the shape of the lens frame (in the area of the contact portion) can be simplified, and the lead screw, the lens frame, the nut, the spring, etc., can be easily and reliably attached and assembled together. Therefore, the productivity of the unit can be heightened although a structure capable of preventing the vibrations of the lens frame is employed.

DETAILED DESCRIPTION OF THE PREFERRED EMBODIMENT

Preferred embodiments of the present invention will be hereinafter described with reference to the accompanying drawings.

Figure 1:
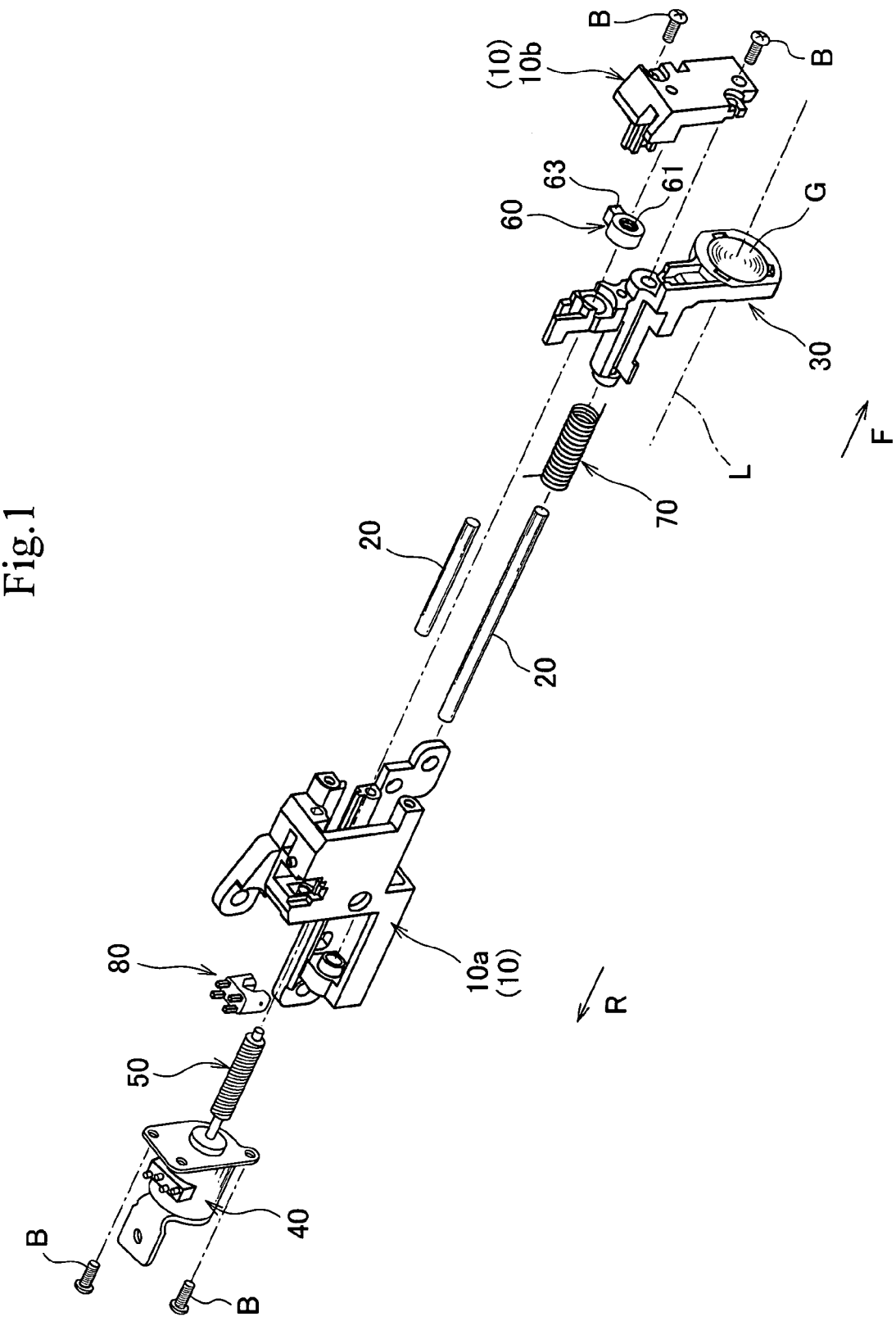
FIG. 1 is an exploded perspective view showing an embodiment of a lens driving unit according to the present invention.
Figure 2:
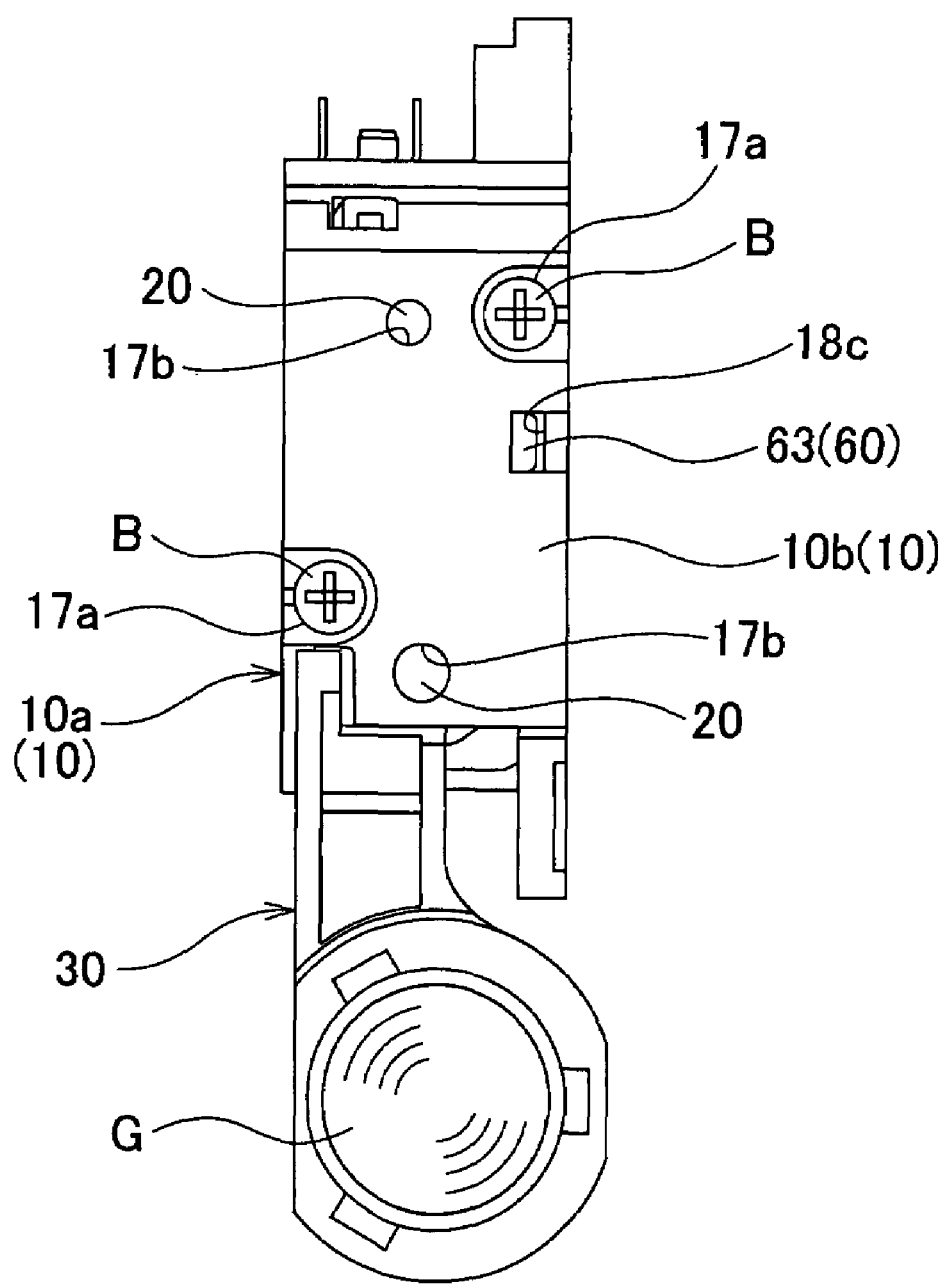
FIG. 2 is a front view of the lens driving unit shown in FIG. 1.

As shown in FIG. 1, the lens driving unit includes a case 10 serving as a base, two guide shafts 20 that are fixed to the case 10 and that extend in the direction of an optical axis L, a lens frame 30 in which a lens G is held and that is supported by the guide shafts 20 movably in the direction of the optical axis L, a motor 40 that serves as a driving source and that is fixed to the case 10, a lead screw 50 that is connected directly to the motor 40 and that extends in the direction of the optical axis L, a nut 60 that is screwed onto the lead screw 50 and that is brought into contact with the lens frame 30, a spring 70 that urges the lens frame 30 toward the nut 60, and a detection sensor 80 that detects an initial position of the lens frame 30.

The case 10 is molded from a resin material, and consists of a case body 10a serving as a first base half body and a case cover 10b serving as a second base half body as shown in FIG. 1 to FIG. 4. The case body 10a and the case cover 10b are tightly connected and fixed together by a screw B, and define an internal space in which the lens frame 30 is disposed movably in the direction of the optical axis L.

Figure 3:
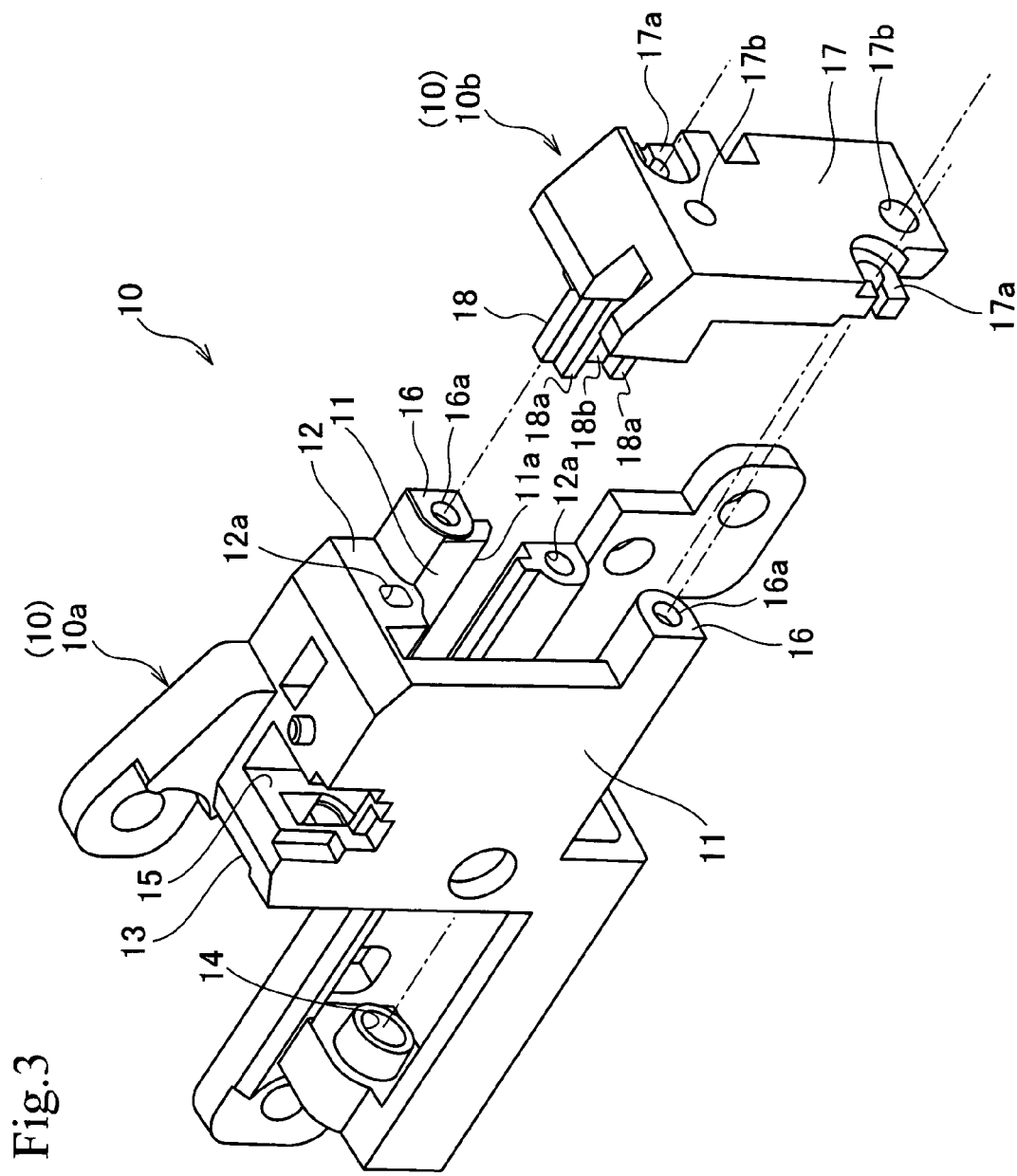
FIG. 3 is an exploded perspective view showing a case (base) that is an element of the lens driving unit shown in FIG. 1.
Figure 6:
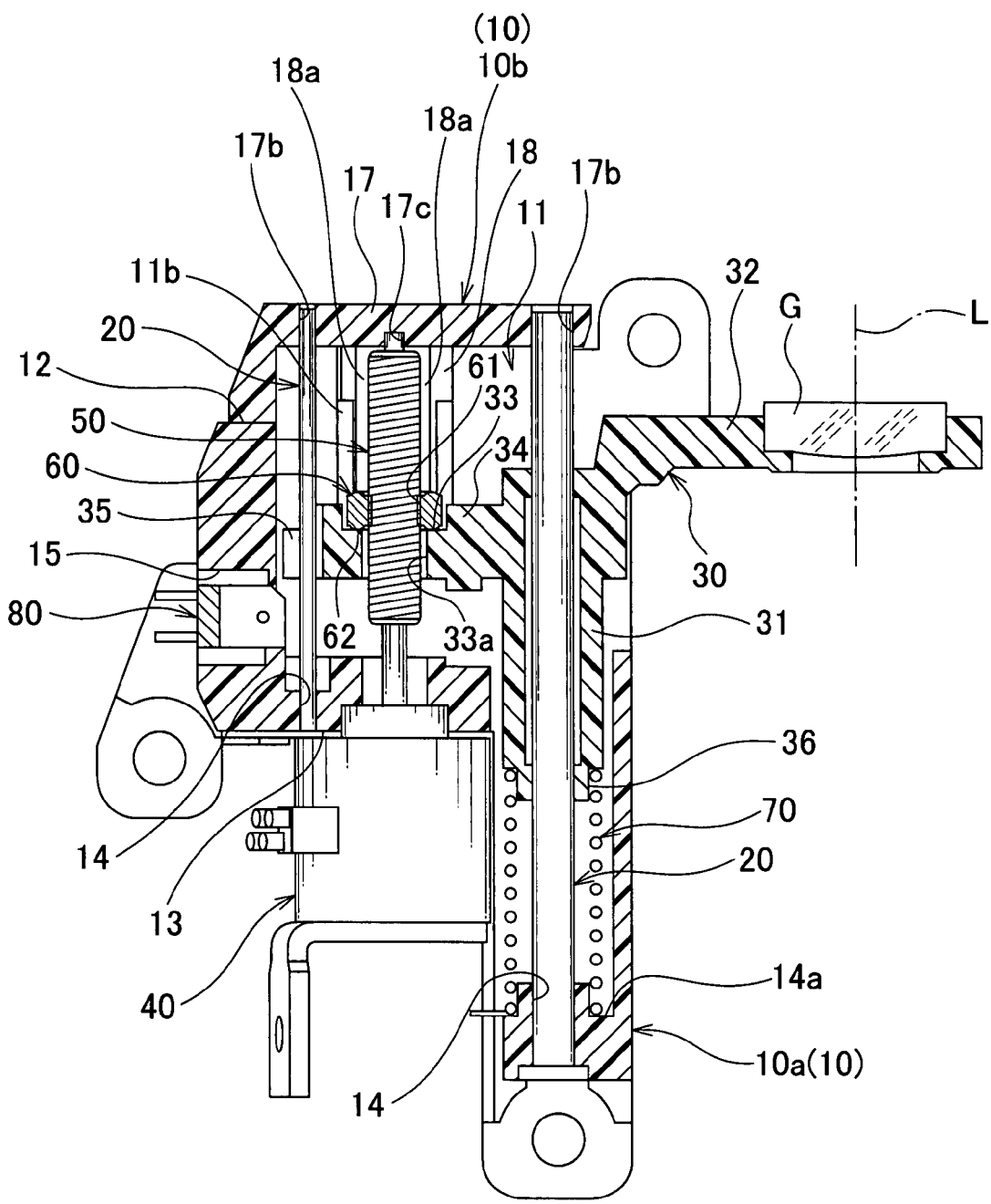
FIG. 6 is a longitudinal sectional view of the lens driving unit shown in FIG. 1.

As shown in FIG. 3 and FIG. 6, the case body 10a includes a pair of sidewalls 11 that extend in the direction of the optical axis L and that define an internal space, an end face 12 that has an opening formed in a forward position in the direction of the optical axis L and to which the case cover 10b is joined, two positioning holes 12a formed in the end face 12, a fixing portion 13 to which the motor 40 is fixed, two fitting holes 14 into each of which each end of the guide shafts 20 is fitted, a spring receiving portion 14a that is formed around one of the fitting holes 14 and that receives an end of the spring 70, a mounting portion 15 that has a substantially rectangular opening and on which the detection sensor 80 is mounted, two bosses 16 each of which protrudes from the end face 12 and each of which has a threaded hole 16a, and various mounting flanges.

Figure 9:
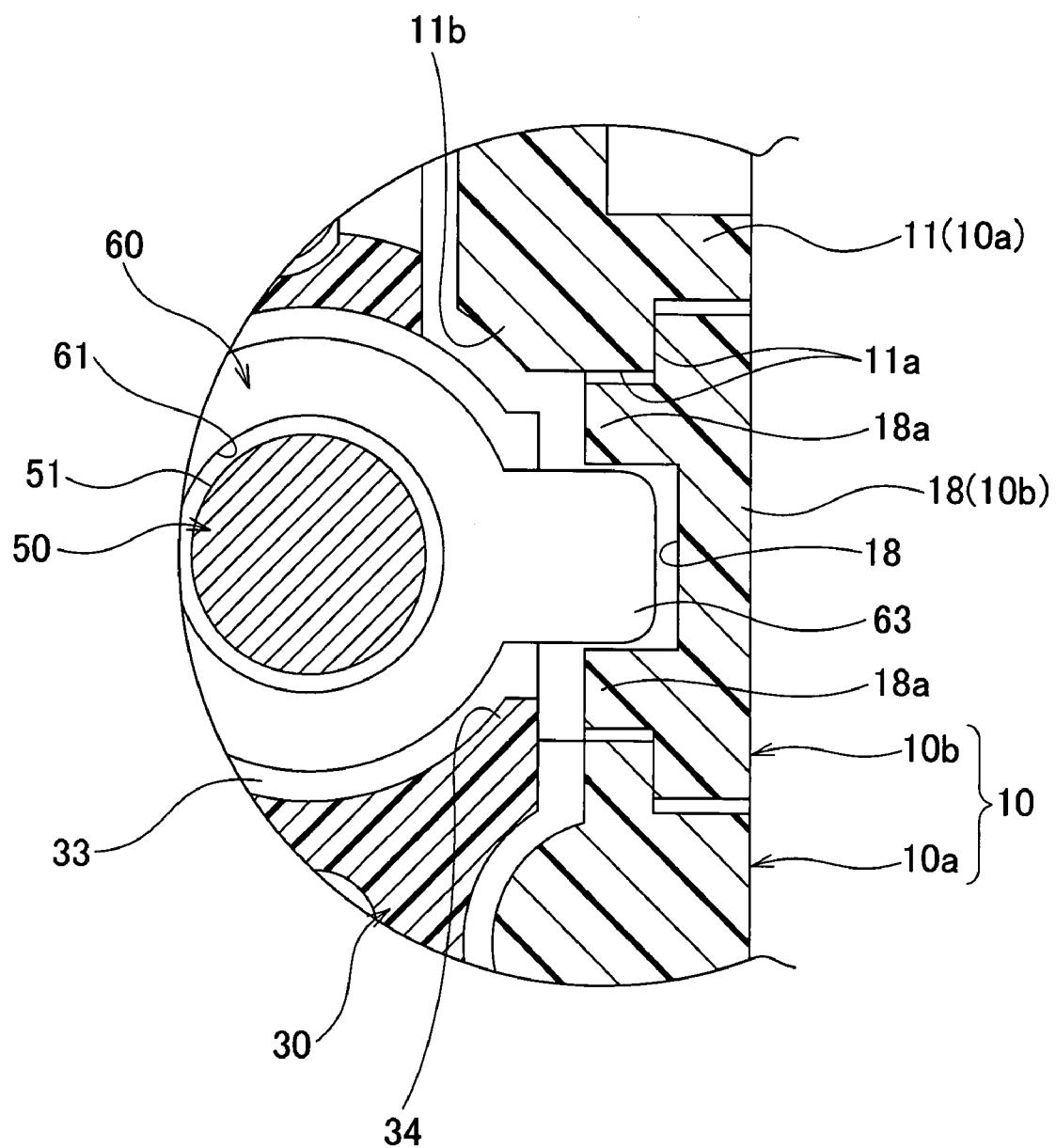
FIG. 9 is a partially enlarged sectional view in which a part of the lens driving unit shown in FIG. 1 is enlarged.

As shown in FIG. 3 and FIG. 9, one of the sidewalls 11 defines a slit 11a that extends in the direction of the optical axis L so as to be fitted to a sidewall 18 of the case cover 10b described later and a regulatory wall 11b serving as a projection-guiding part that juts toward the nut 60 in an area adjacent to the slit 11a (i.e., from an area near a guide groove 18b) and that extends in the direction of the optical axis L.

Figure 4:
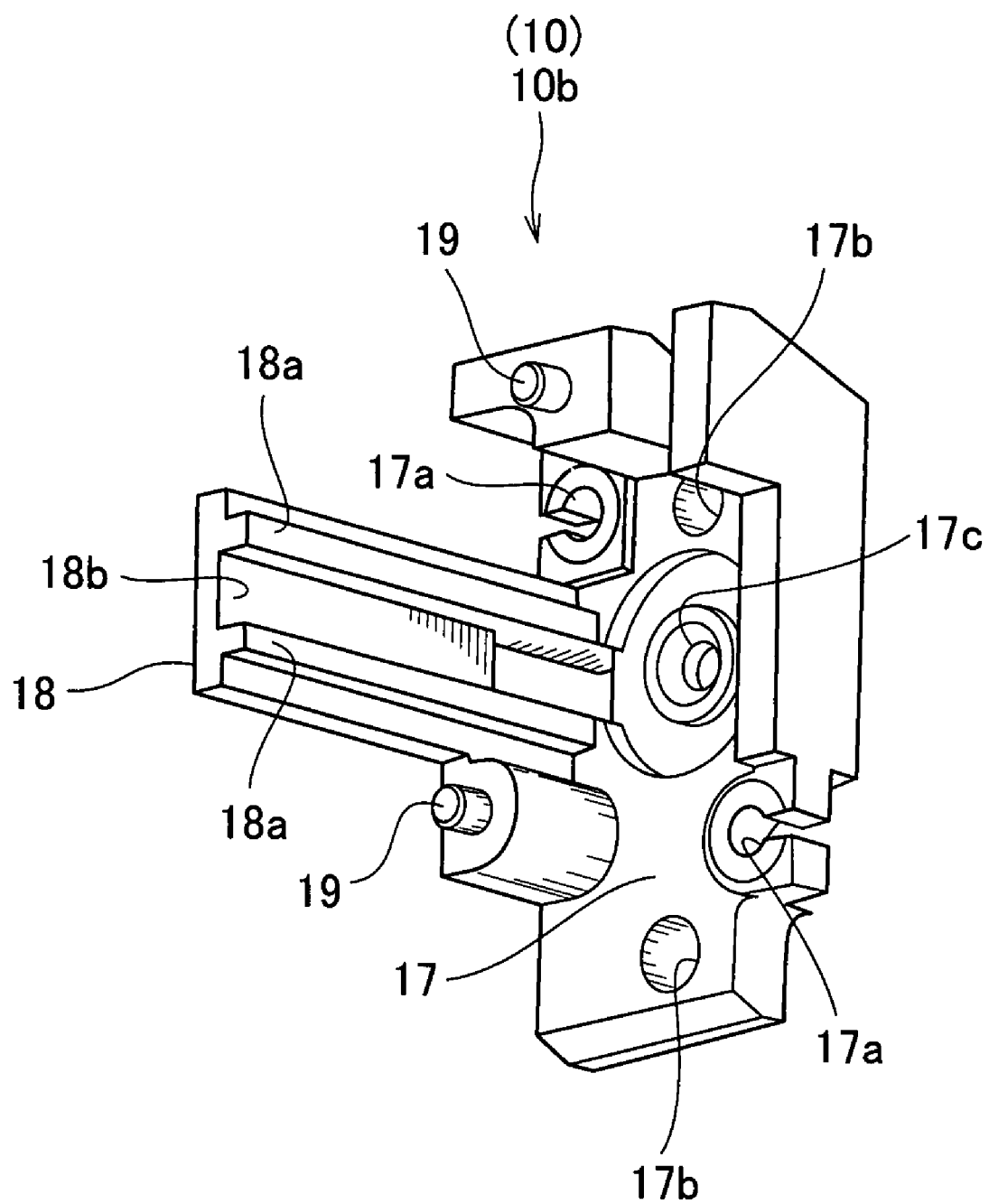
FIG. 4 is a perspective view showing a part of the case (base) that is an element of the lens driving unit shown in FIG. 1.
Figure 5:
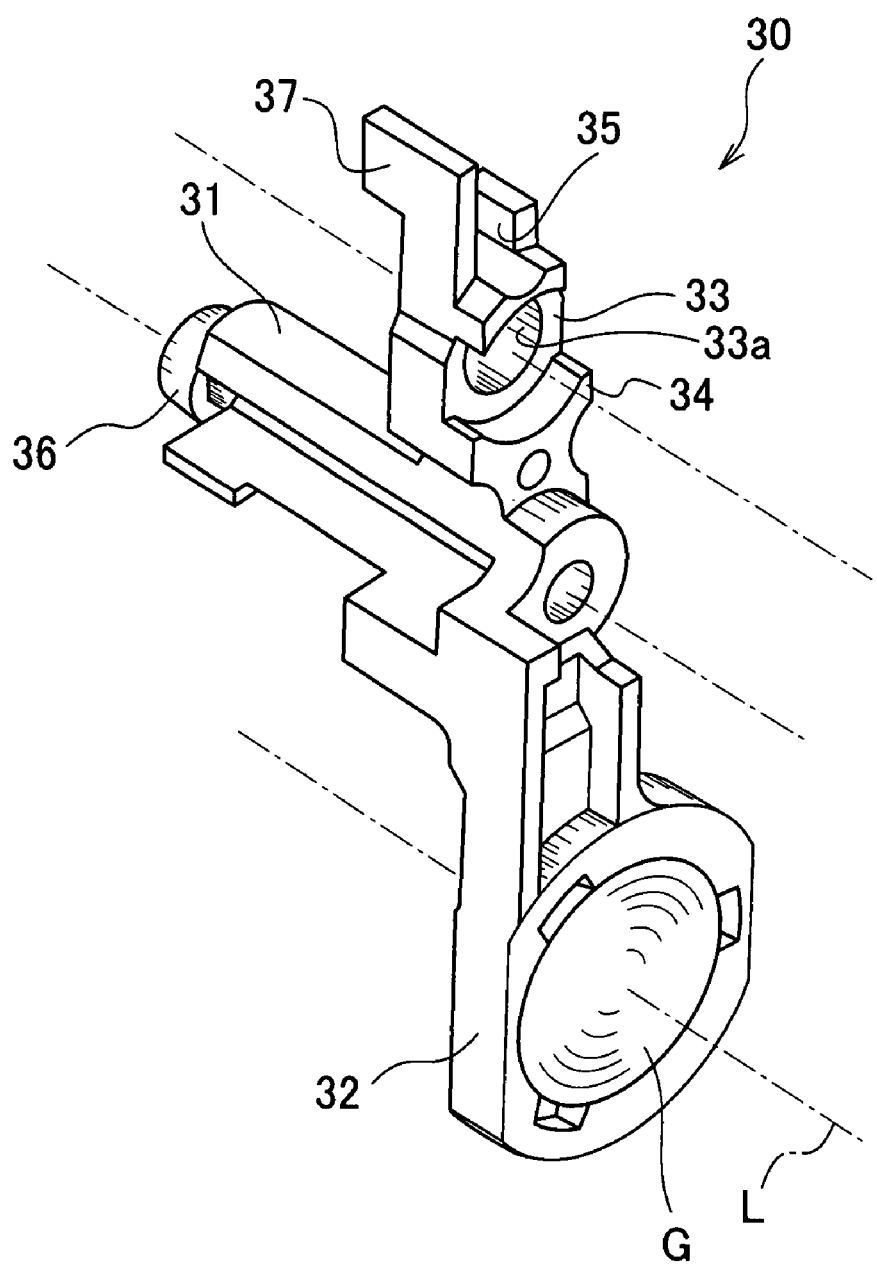
FIG. 5 is a perspective view showing a lens frame that is an element of the lens driving unit shown in FIG. 1.

As shown in FIG. 3 and FIG. 4, the case cover 10b includes an end face wall 17 that extends in a direction substantially perpendicular to the direction of the optical axis L and with which an internal space defined by the case body 10a is covered, the sidewall 18 that extends in the direction of the optical axis L from the end face wall 17 and that is fitted to the slit 11a of the sidewall 11, two positioning pins 19 each of which is formed at a position protruding in the direction of the optical axis L from the end face wall 17 and each of which is fitted into the positioning hole 12a of the end face 12, a through-hole 17a formed on the end face wall 17 for passing through a screw B, two fitting holes 17b into each of which each other end of the guide shafts 20 is fitted, a bearing hole 17c that supports a tip of the lead screw 50, a pair of walls 18a formed to extend in the direction of the optical axis in the sidewall 18, and a guide groove 18b that is defined by the pair of walls 18a so as to extend in the direction of the optical axis L and that receives a projection 63 of the nut 60 described later.

As shown in FIGS. 1, 6, 7, and 8, each of the two guide shafts 20 is made of a metallic material in a circular shape in cross section, and extends in the direction of the optical axis L. An end of the guide shaft 20 is fitted into the fitting hole 14 of the case body 10a, whereas the other end thereof is fitted into the fitting hole 17b of the case cover 10b. One of the guide shafts 20 guides the lens frame 30 in the direction of the optical axis L, whereas the other guide shaft 20 guides the lens frame 30 in the direction of the optical axis L, and regulates the rotation of the lens frame 30 around the optical axis L.

The lens frame 30 is made of a resin material, and, as shown in FIG. 5 to FIG. 9, includes a connecting portion 31 that extends in the direction of the optical axis L and to which the guide shaft 20 is slidably fitted and connected, an annular portion 32 that extends from the connecting portion 31 radially in one direction and that holds a lens G, a contact portion 33 that extends in another direction from the connecting portion 31 and that defines a flat surface with which an end face 62 of the nut 60 (described later) comes into contact and a through-hole 33a through which the lead screw 50 passes in a non-contact manner, a regulatory wall 34 serving as a projection-guiding part that protrudes in the direction of the optical axis L from an area surrounding the contact portion 33 and that restricts the direction of the projection 63 of the nut 60 within a predetermined angular range, a U-shaped connecting portion 35 that further extends from the contact portion 33 and to which the guide shaft 20 is slidably fitted and connected, a spring receiving portion 36 that receives an end of the spring 70 at an end of the connecting portion 31, and a to-be-detected piece 37 that extends in the direction of the optical axis L from the connecting portion 35 and that is detected by the detection sensor 80.

In a state in which the end face 62 of the nut 60 (described later) that has been screwed onto the lead screw 50 is in contact with the contact portion 33, the lens frame 30 holds the nut 60 detachably in the direction of the optical axis while maintaining a non-contact state with the outer periphery of the nut 60.

The motor 40 is a stepping motor that can be rotated in a step manner with predetermined angle intervals, and, as shown in FIG. 1 and FIG. 6, is fixed by the screw B onto the fixing portion 13 of the case body 10a. The motor 40 can exert a rotational driving force on the lead screw 50 connected directly thereto.

Figure 7:
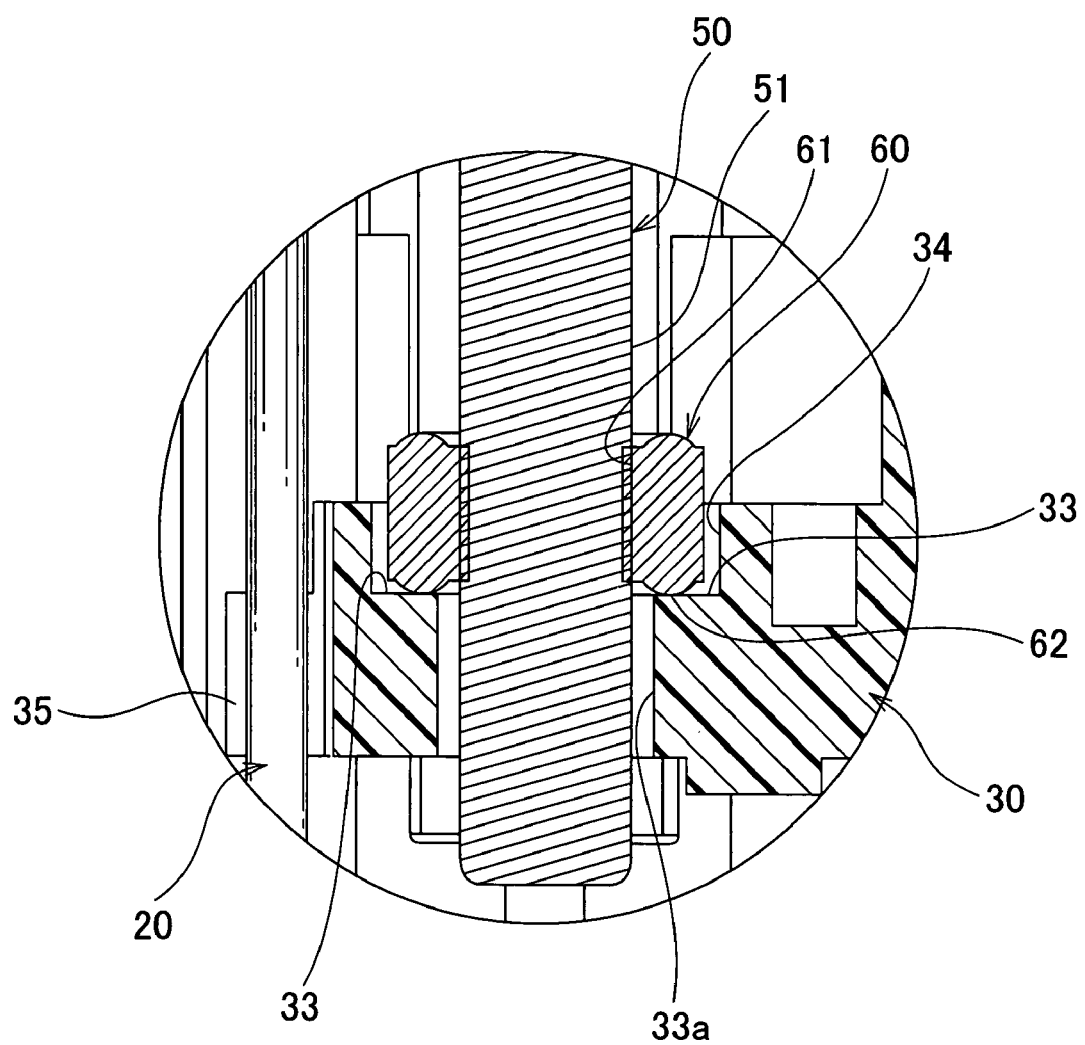
FIG. 7 is a partially enlarged sectional view in which a part of the lens driving unit shown in FIG. 1 is enlarged.

As shown in FIGS. 1, 6, and 7, the lead screw 50 is made of a metallic material extends in the direction of the optical axis L, and has a male thread 51 in a predetermined area of its outer periphery.

As shown in FIGS. 1, 6, 7, 8, and 9, the nut 60 is made of a metallic material, and has a female thread 61 that is engaged with the male thread 51 of the lead screw 50, an end face 62 that faces in the direction of the optical axis L and that is brought into contact with the contact portion 33 of the lens frame 30, and a projection 63 that protrudes in a radial direction from the outer periphery and that has a width suitable to be inserted into the guide groove 18b.

The projection 63 has a width not to cause a bumpy movement resulting from the rotation of the nut 60 around the lead screw 50, and is formed to be slidable in the longitudinal direction (i.e., in the direction of the optical axis L) of the guide groove 18b.

As shown in FIG. 1 and FIG. 6, the spring 70 is a helical compression spring. The spring 70 has its one end joined to the spring receiving portion 14a of the case body 10a and the other end joined to the spring receiving portion 36 of the lens frame 30, and is attached in a state of being compressed on a predetermined compression margin. Therefore, the spring 70 urges the lens frame 30 forwardly in the direction of the optical axis L, and exerts an urging force on the contact portion 33 of the lens frame 30 so as to press the contact portion 33 against the nut 60 (in more detail, against the end face 62 of the nut 60).

The detection sensor 80 is a transmission type photosensor having a light emitting element and a light receiving element, and detects the initial position (home position) of the lens frame 30 according to the presence or absence of the to-be-detected piece 37 of the lens frame 30.

Next, the assembly of elements of the lens driving unit will be described.

First, the motor 40 to which the lead screw 50 is directly connected is tightened and fixed by the screw B onto the fixing portion 13 of the case body 10a. The two guide shafts 20 and 20 are then fitted and fixed to the fitting holes 14 and 14 of the case body 10a, respectively. The detection sensor 80 is then attached and fixed to the mounting portion 15 of the case body 10a.

Thereafter, the spring 70 is fitted onto one of the guide shafts 20, and the one end of the spring 70 is seated on the spring receiving portion 14a. The lens frame 30 is then brought close thereto from a forward position F in the direction of the optical axis L. The guide shafts 20 and 20 are then slidably passed through the connecting portions 33 and 35, respectively, while compressing the other end of the spring 70 by use of the spring receiving portion 36, and the lead screw 50 is held in a state of being passed through the through-hole 33a in a non-contact manner.

Thereafter, the nut 60 is allowed to approach the lead screw 50 from a forward position F in the direction of the optical axis L, is then screwed onto the lead screw 50, and is moved to reach a predetermined depth (toward a rearward position R in the direction of the optical axis L).

Figure 10:
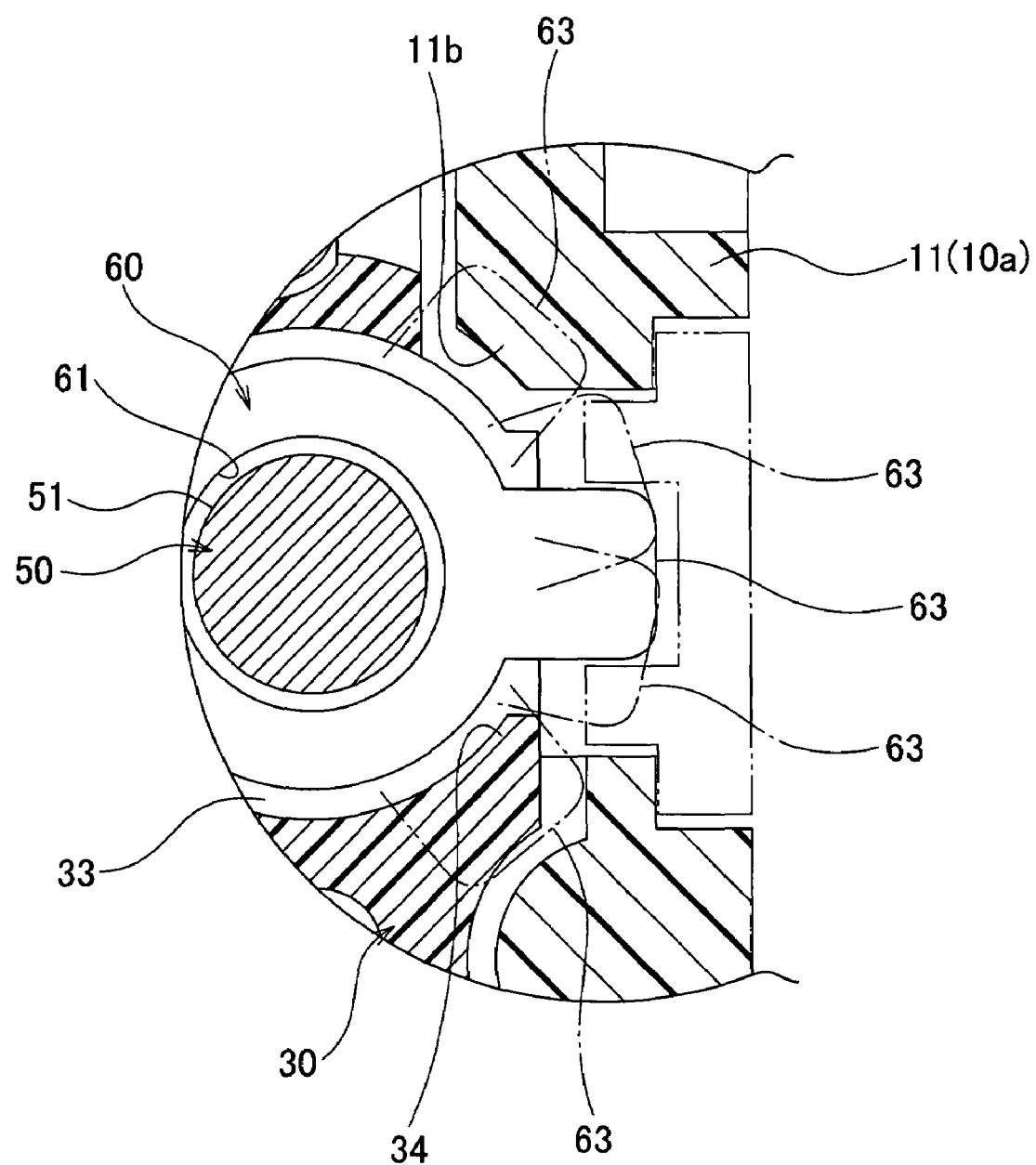
FIG. 10 is a partially enlarged sectional view for explaining the assembly of elements of the lens driving unit shown in FIG. 1.

Thereafter, the projection 63 of the nut 60 is directed to be placed in a predetermined angular range restricted by the regulatory wall 34 (of the case body 10a) and the regulatory wall 11b (of the lens frame 30) as shown in FIG. 10. The lens frame 30 is then released, and is moved toward the forward position F in the direction of the optical axis L by the urging force of the spring 70 so that the contact portion 33 comes into contact with the end face 62 of the nut 60.

Thus, the projection 63 of the nut 60 can be directed toward a predetermined angular range (i.e., in the direction of the projection 63 shown by dot-and-dash lines, and preferably, in the direction of the projection 63 shown by the solid line) by the regulatory wall 34 of the lens frame 30 and the regulatory wall 11b of the case body 10a during assembly, and hence the nut 60 can be prevented from being attached in a state of directing the projection 63 toward the position shown by two dots-and-dash lines.

Therefore, the projection 63 of the nut 60 can be pre-directed (i.e., can be guided) toward the guide groove 18b of the case cover 10b that is attached at a post-process step.

Thereafter, the other ends of the guide shafts 20 and 20 are fitted into the fitting holes 17b and 17b, respectively, and the positioning pins 19 and 19 are fitted into the positioning holes 12a and 12a, respectively, while bringing the case cover 10b close thereto from the forward position F in the direction of the optical axis L. Likewise, the tip of the lead screw 50 is fitted into the bearing hole 17c, and the sidewall 18 is fitted into the slit 11a.

When the projection 63 of the nut 60 is directed toward the position shown by the solid line of FIG. 10, the projection 63 of the nut 60 smoothly enters the guide groove 18b.

On the other hand, when the projection 63 of the nut 60 is directed toward the position shown by dot-and-dash lines, the sidewall 18 cannot be smoothly fitted into the guide groove 18b, and hence an operator manually directs the projection 63 in the direction shown by the solid line.

Figure 8:
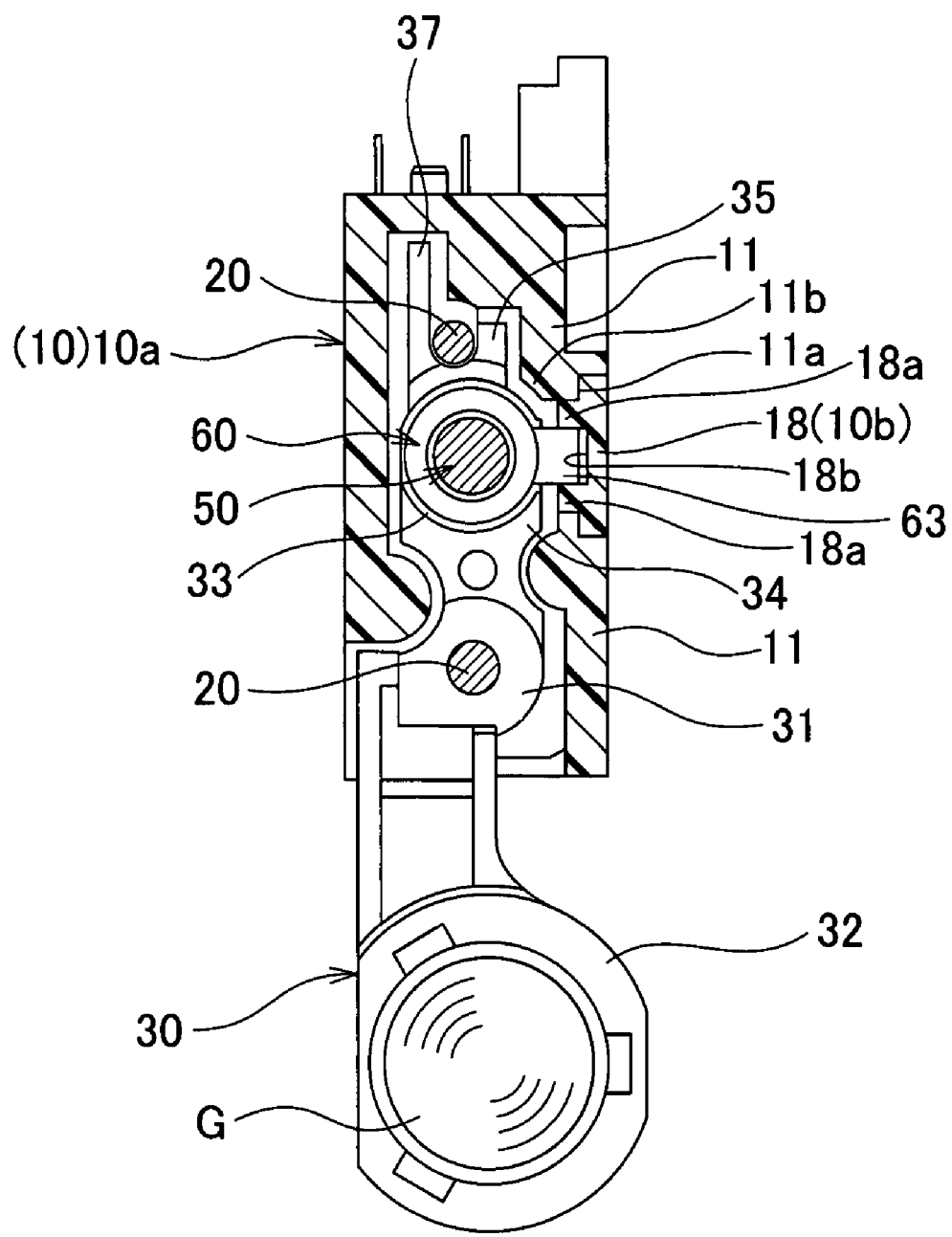
FIG. 8 is a transverse sectional view of the lens driving unit shown in FIG. 1.

Thereafter, the sidewall 18 is fitted into the slit 11a, and the screw B is passed through the through-hole 17a, and is tightened to be fitted in the threaded hole 16a. As a result, the case cover 10b is firmly attached to the case body 10, and, as shown in FIG. 8 and FIG. 9, the nut 60 is incorporated so that the projection 63 is directed along the guide groove 18b so as to be movable in the direction of the optical axis L, whereby the assembly of the entire unit is completed.

As described above, the projection 63 of the nut 60 is guided by the regulatory wall 11b (i.e., projection-guiding part) of the case body 10a and the regulatory wall 34 (i.e., projection-guiding part) of the lens frame 30, and is fitted into the guide groove 18b during assembly. Therefore, the projection 63 can be securely attached so as not to deviate from the guide groove 18b, and an easy assembling operation can be performed, thus a desired function can be reliably assured.

Since the case cover 10b is attached to the case body 10a especially in a state in which the nut 60 has been connected to the lead screw 50 held by the case body 10a and in which the projection 63 of the nut 60 has been directed in a predetermined direction by the regulatory walls 34 and 11b, the projection 63 can be securely fitted into the guide groove 18b, and an easier assembling operation can be reliably performed.

Additionally, since the regulatory wall 34 formed integrally with the lens frame 30 and the regulatory wall 11b formed integrally with the case body 10a are each used as a projection-guiding part, this unit can be made simpler in structure than a unit including a specialized part. Still additionally, if the lens frame 30 is molded from resin, the contact portion 33 and the regulatory wall 34 can be easily molded together, and, if the case body 10a is molded from resin, the regulatory wall 11b can be easily molded as a part of the sidewall 11.

Thus, the elements of the unit can be easily and reliably attached and assembled merely by preparing and fitting the spring 70, the lens frame 30, the nut 60, and the case cover 10b, in this order, to the case body 10a from a forward position in the direction of the optical axis L. Therefore, the assembling operation can be easily and swiftly performed, and productivity can be heightened.

Next, the operation of the lens driving unit will be described.

First, when the lens frame 30 is located in a rearward position (initial position) in the direction of the optical axis L, the detection sensor 80 detects the to-be-detected piece 37.

Thereafter, the motor 40 is positively rotated, and the lead screw 50 is rotated. Accordingly, the projection 63 is guided only in the direction of the optical axis L while being restrained by the guide groove 18b of the case 10 so as not to be rotated, and the nut 60 is moved by a screw feed action toward a forward position in the direction of the optical axis L.

As a result, the contact portion 33 is moved by the urging force of the spring 70 while following the nut 60, and hence the lens frame 30 is moved together with the nut 60 toward a forward position in the direction of the optical axis L.

Thereafter, the number of steps from the start of the motor 40 is counted, and the lens frame 30 is placed in a desired position while properly controlling the amount of driving of the lens frame 30.

On the other hand, when the motor 40 is reversely rotated, the lead screw 50 is rotated in response thereto, and the projection 63 is guided only in the direction of the optical axis L while being restrained by the guide groove 18b of the case 10 so as not to be rotated. Accordingly, the nut 60 is moved by a screw feed action toward a rearward position in the direction of the optical axis L.

As a result, the contact portion 33 is pushed by the nut 60 while resisting the urging force of the spring 70. Therefore, the lens frame 30 is moved together with the nut 60 toward a backward position in the direction of the optical axis L, is then placed in a desired position while properly controlling the amount of driving of the lens frame 30, and is further moved rearwardly, thus returning to the initial position.

The nut 60 is in contact with the guide groove 18b of the base 10 so as not to be rotated, and is in non-contact with the regulatory wall 11b. Additionally, the nut 60 is in contact only with the contact portion 33 in the direction of the optical axis L, and is in non-contact with the other parts (e.g., the regulatory wall 34) of the lens frame 30 in a direction perpendicular to the optical axis L. Therefore, in the driving operation, slight vibrations can be prevented from being transmitted to the lens frame 30 even if the nut 60 is slightly vibrated because of a load fluctuation caused by, for example, a machining tolerance of the male thread 51 or the female thread 61, or because of the rotational force of the lead screw 50 and a reaction force thereagainst.

In other words, according to this lens driving unit, a simplification of the structure and a reduction in size can be achieved, and the lens frame 30 (and the lens G in the lens frame 30) can be stably driven with high accuracy in the direction of the optical axis L without being vibrated even if the nut 60 engaged with the lead screw 50 is slightly vibrated.

Therefore, if this lens driving unit is applied to, for example, an optical pick-up unit, the focus can be kept constant without irregularly varying the optical axis even while the lens frame 30 is being driven.

Figure 11:
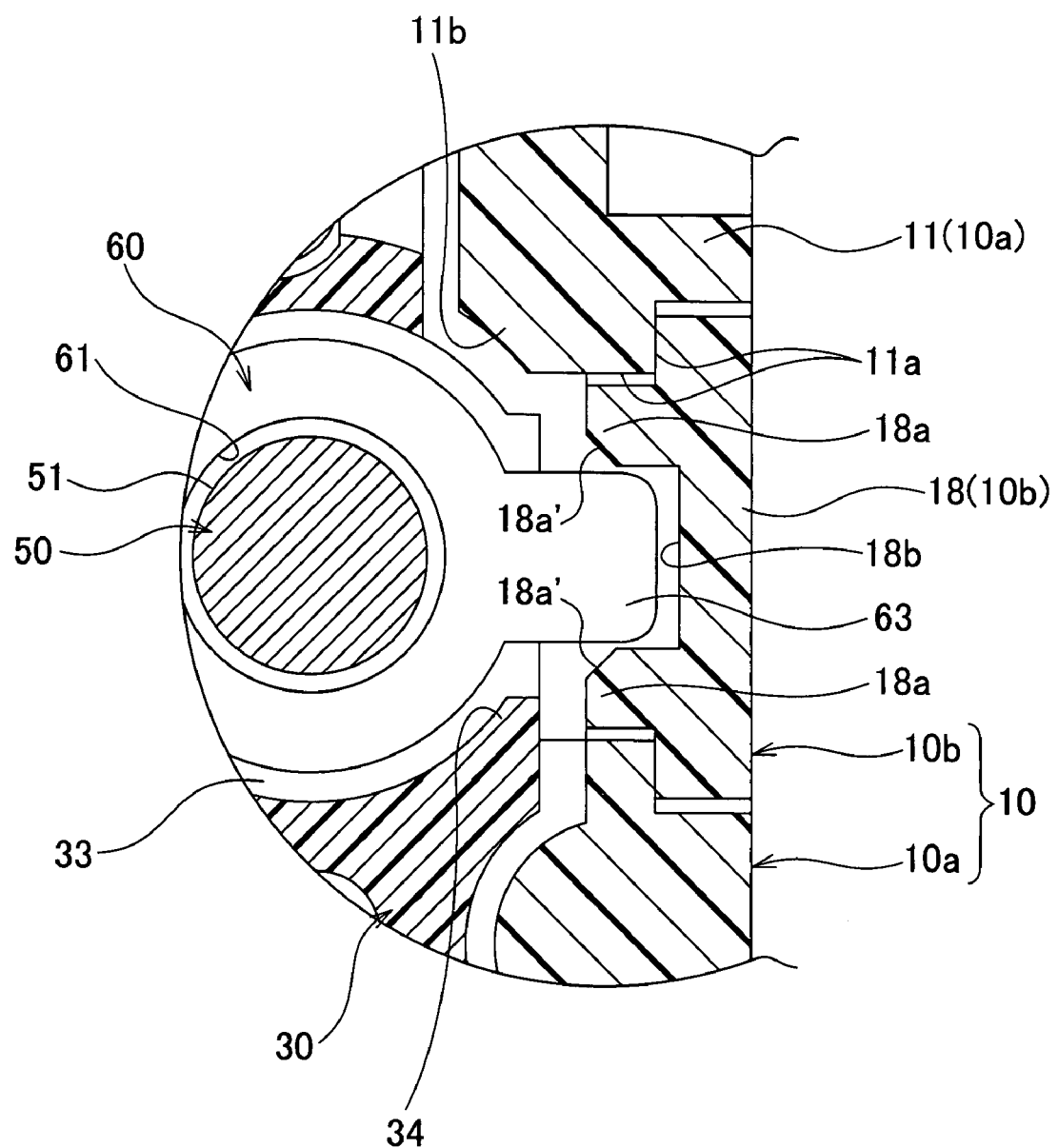
FIG. 11 is a partially enlarged sectional view showing another embodiment of the lens driving unit according to the present invention.

FIG. 11 shows another embodiment of the lens driving unit according to the present invention. This embodiment is the same as the above-mentioned embodiment except that a part of the case cover 10b is modified. Therefore, in this embodiment, the same reference numeral is given to the same structure as in the above-mentioned embodiment, and a description of the same structure is omitted.

As shown in FIG. 11, in the case cover 10b of this unit, each of a pair of wall parts 18a (of the sidewall 18) has an inclined surface 18a' widened outwardly at its end face edge.

The inclined surface 18a' is formed so as to guide the projection 63 of the nut 60 to the guide groove 18b. Therefore, the projection 63 of the nut 60 is guided to the guide groove 18b along the inclined surfaces 18a' of the pair of wall parts 18a during assembly, and hence the projection 63 can be smoothly fitted into the guide groove 18b.

Figure 12:
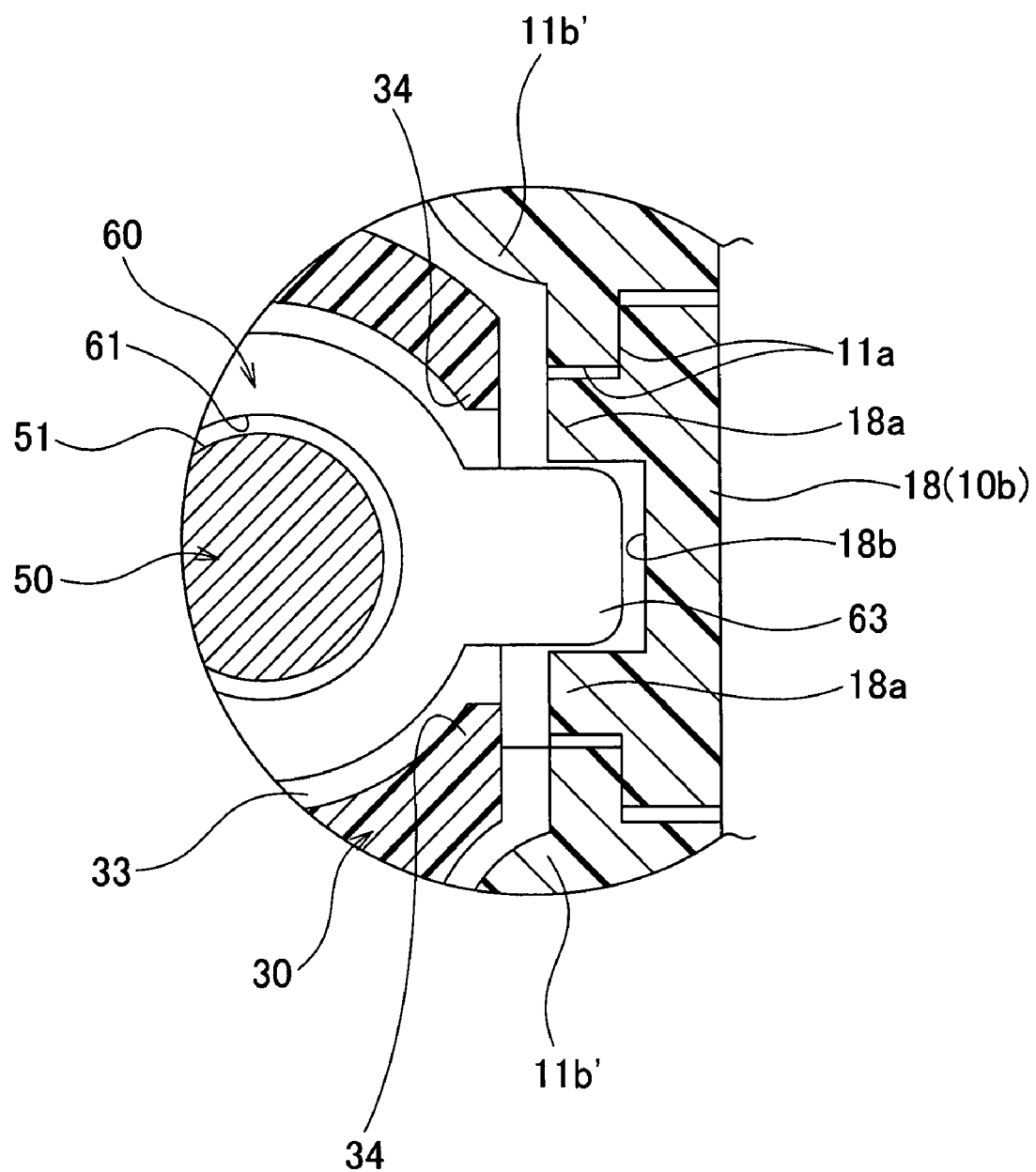
FIG. 12 is a partially enlarged sectional view showing still another embodiment of the lens driving unit according to the present invention.

FIG. 12 shows still another embodiment of the lens driving unit according to the present invention. In this embodiment, the position in which the projection guiding part (regulatory wall) is disposed as in the above-mentioned embodiment is changed. Therefore, in this embodiment, the same reference numeral is given to the same structure as in the above-mentioned embodiment, and a description of the same structure is omitted.

In this unit, the sidewall 11 of the case body 10a is formed to define a curved part 11b' curved near both sides of the slit 11a so that the projection 63 of the nut 60 does not collide thereagainst. Additionally, the lens frame 30 has two regulatory walls 34 formed integrally therewith and formed in such a way that the projection 63 is sandwiched between the regulatory walls 34 with a predetermined gap between the projection 63 and the regulatory wall 34 around the contact portion 33.

The two regulatory walls 34 direct the projection 63 toward a predetermined angular range in a state in which the nut 60 is in contact with the contact portion 33. Therefore, the nut 60 is securely attached so that the projection 63 does not deviate from the guide groove 18b during assembly. Therefore, the structure can be simplified, and the assembling operation can be facilitated, thus reliably assuring a desired function.

Figure 13:
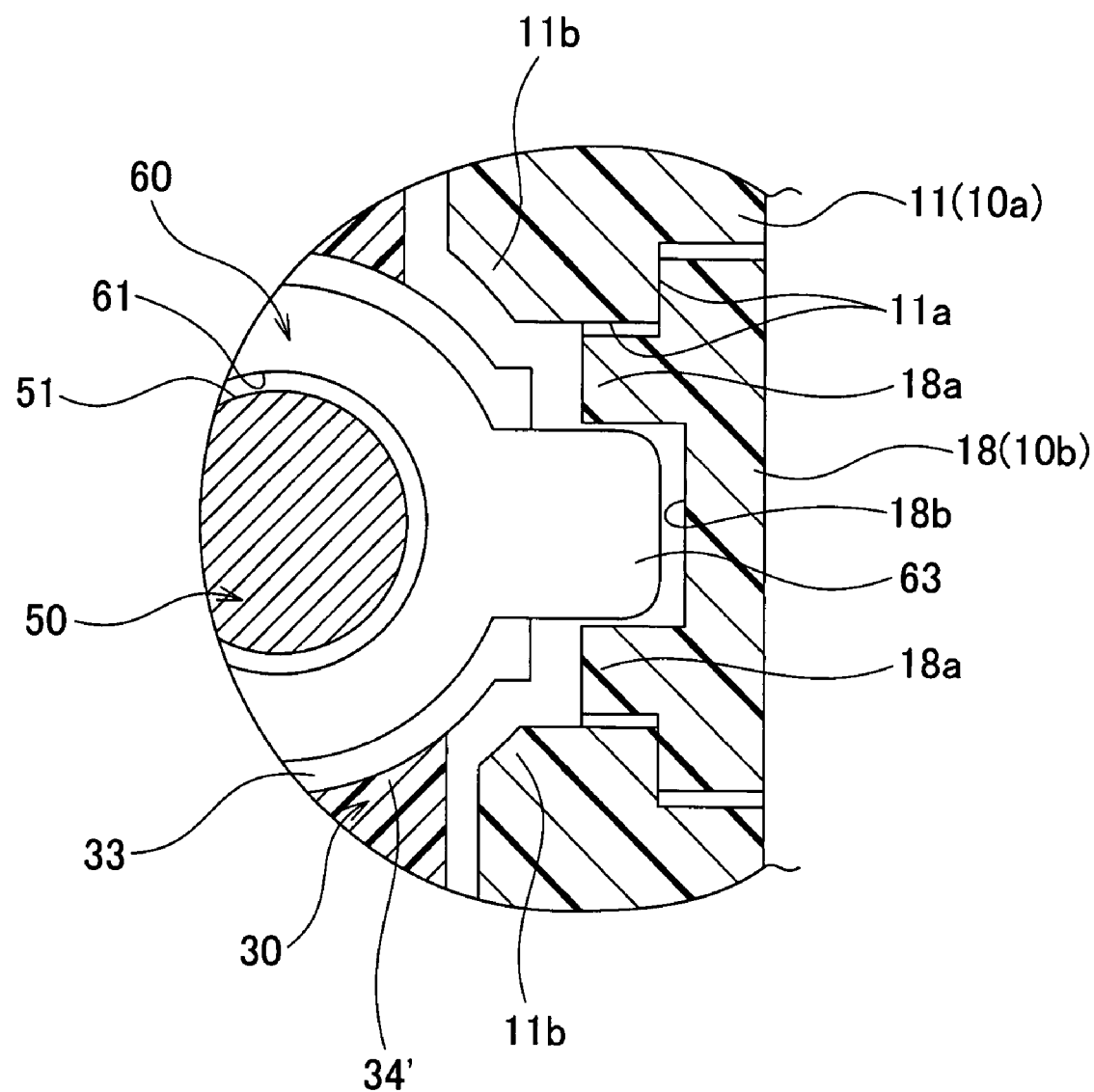
FIG. 13 is a partially enlarged sectional view showing still another embodiment of the lens driving unit according to the present invention.

FIG. 13 shows still another embodiment of the lens driving unit according to the present invention. In this embodiment, the position in which the projection guiding part (regulatory wall) is disposed as in the above-mentioned embodiment is changed. Therefore, in this embodiment, the same reference numeral is given to the same structure as in the above-mentioned embodiment, and a description of the same structure is omitted.

In this unit, the sidewall 11 of the case body 10a has two regulatory walls 11b formed integrally therewith in an area near both its sides between which the guide groove 18b is arranged. Additionally, the lens frame 30 has a regulatory wall 34' formed integrally therewith in a position receding from the regulatory wall 11b around the contact portion 33.

The two regulatory walls 11b direct the projection 63 toward a predetermined angular range in a state in which the nut 60 is in contact with the contact portion 33. Therefore, the nut 60 is securely attached so that the projection 63 guided by the regulatory walls 11b does not deviate from the guide groove 18b during assembly. Therefore, the structure can be simplified, and the assembling operation can be facilitated, thus a desired function can be reliably assured.

As described above, according to the present invention, it is possible to obtain a lens driving unit capable of achieving a simplification of the structure and a reduction in size, capable of preventing slight vibrations of a nut from being transmitted to a lens frame even if the nut that is screwed to a lead screw generates these vibrations, and capable of reliably attaching the nut while directing the nut in a predetermined direction during assembly.

In the above-mentioned embodiments, the single lens frame 30 is shown as a lens frame moving in the direction of the optical axis L. However, without being limited to this, the present invention can be applied to a structure including a plurality of lens frames. In this example, one guide groove may be shared, or a plurality of guide grooves may be provided for such lens frames, respectively.

In the above-mentioned embodiments, an example is shown in which the spring 70 is used to bring the contact portion 33 of the lens frame 30 into contact with the end face 62 of the nut 60. However, without being limited to this, the present invention can be applied to a structure in which the spring 70 is removed by providing the lens frame 30 with an arrangement in which the nut 60 (i.e., end faces on both sides of the nut) is sandwiched from both sides in the direction of the optical axis L.

In the above-mentioned embodiments, the case 10 is shown as a base. However, without being limited to this, it is permissible to employ a base that does not define an internal space and that is formed to expose the lens frame 30 and the like outwardly. Additionally, in the above-mentioned embodiments, a halved-structure case consisting of a first base half body (case body 10a) and a second base half body (case cover 10b) is shown as a base. However, without being limited to this, an integral-structure base may be employed.

The lens driving unit of the present invention is capable of achieving a simplification of the structure and a reduction in size, is capable of preventing slight vibrations of a nut from being transmitted to a lens frame, and is capable of reliably attaching the nut while directing the nut in a predetermined direction during assembly. Therefore, the lens driving unit of the present invention is, of course, applicable to, for example, an optical pick-up unit, and is useful for other lens optical systems if these optical systems are required to prevent the transmission of vibrations from a nut to a lens frame.

What is claimed is:

1. A lens driving unit comprising:
   a base;
   a driving source fixed to the base;
   a lead screw rotated and driven by the driving source;
   a nut that is screwed to the lead screw and that has a projection protruding in a radial direction; and
   a lens frame that is supported movably in a direction of an optical axis with respect to the base and that has a contact portion coming into contact with the nut in the direction of the optical axis, wherein:
   the nut is held so that only an end face thereof in the direction of the optical axis comes into contact with the lens frame;
   the base has a guide groove that receives and guides the projection in the direction of the optical axis; and
   the base or the lens frame has a projection-guiding part that directs and guides the projection of the nut screwed to the lead screw toward the guide groove while coming into contact with the projection only during assembly and that maintains a non-contact state with the projection after completion of the assembly.

2. The lens driving unit of claim 1, wherein the projection-guiding part includes a regulatory wall that is formed on the lens frame so as to protrude in the direction of the optical axis from an area around the contact portion to restrict a direction of the projection to a predetermined angular range.

3. The lens driving unit of claim 1, wherein the projection-guiding part includes a regulatory wall that is formed on the base so as to protrude from an area near the guide groove toward the nut and extend in the direction of the optical axis to restrict a direction of the projection to a predetermined angular range.

4. The lens driving unit of claim 1, wherein the base includes a first base half body that rotatably supports the lead screw and a second base half body that defines the guide groove and that is attached to the first base half body.

5. The lens driving unit of claim 1, further comprising a pair of wall parts that define the guide groove, each of the pair of wall parts having an inclined surface used to guide the projection of the nut to the guide groove.

6. The lens driving unit of claim 1, wherein the contact portion of the lens frame is formed so as to be detachably in contact with the end face of the nut only from one direction in the direction of the optical axis, and is urged by a spring so as to come into contact with the nut.

* * * * *